US007227455B2

(12) United States Patent
Waszkowski

(10) Patent No.: US 7,227,455 B2
(45) Date of Patent: Jun. 5, 2007

(54) MILEAGE INFORMATION DISPLAY SYSTEM

(75) Inventor: Paul J. Waszkowski, Hinckley, OH (US)

(73) Assignee: Bendix Commercial Vehicle Systems, Elyria, OH (US)

( * ) Notice: Subject to any disclaimer, the term of this patent is extended or adjusted under 35 U.S.C. 154(b) by 22 days.

(21) Appl. No.: 10/605,085

(22) Filed: Sep. 8, 2003

(65) Prior Publication Data

US 2004/0113811 A1 Jun. 17, 2004

Related U.S. Application Data

(60) Provisional application No. 60/409,619, filed on Sep. 10, 2002.

(51) Int. Cl.
*G01M 17/00* (2006.01)

(52) U.S. Cl. ......................... 340/441; 340/445; 701/35

(58) Field of Classification Search ................ 340/438, 340/870.02, 445; 701/33, 35
See application file for complete search history.

(56) References Cited

U.S. PATENT DOCUMENTS

| | | | | |
|---|---|---|---|---|
| 3,668,684 A | | 6/1972 | Johnson et al. | |
| 3,940,735 A | | 2/1976 | Kronenberg | |
| 4,224,514 A | | 9/1980 | Weber | |
| 4,244,514 A | | 1/1981 | Nomura et al. | |
| 4,292,624 A | * | 9/1981 | Serp | 341/66 |
| 4,371,935 A | | 2/1983 | Yumaki | |
| 4,501,005 A | | 2/1985 | Miller | |
| 4,685,116 A | * | 8/1987 | Toumayan | 377/51 |
| 4,837,552 A | | 6/1989 | Vandemotter | |
| 4,862,486 A | | 8/1989 | Wing et al. | |
| 5,265,468 A | | 11/1993 | Holst et al. | |
| 5,267,159 A | * | 11/1993 | O'Neall | 701/35 |
| 5,337,236 A | * | 8/1994 | Fogg et al. | 701/35 |
| 5,524,034 A | | 6/1996 | Srygley | |
| 5,602,563 A | * | 2/1997 | Chang et al. | 345/629 |
| 5,748,076 A | * | 5/1998 | Horie | 340/442 |
| 5,780,732 A | | 7/1998 | Giesler et al. | |
| 5,844,475 A | * | 12/1998 | Horie | 340/442 |
| 5,859,479 A | * | 1/1999 | David | 307/10.8 |
| 5,892,439 A | | 4/1999 | Molina Torres | |

(Continued)

FOREIGN PATENT DOCUMENTS

EP 0892370 A2 * 1/1999

(Continued)

*Primary Examiner*—Jeffery Hofsass
*Assistant Examiner*—Anne V. Lai
(74) *Attorney, Agent, or Firm*—Calfee, Halter & Criswold, LLP

(57) ABSTRACT

An mileage communication system for a vehicle, such as a trailer, is disclosed. Mileage data is communicated to a processor by a sensor. The processor calculates cumulative mileage and encodes the mileage data into a code, such as an ON-OFF code, that is capable of being communicated to an output device. The vehicle operator may activate a user interface that is capable of generating a request signal to be sent to the processor. Upon receipt of the request signal, the processor communicates the code to the output device. In response to the code from the processor, the output device communicates a visual or audible signal, such as an ON-OFF signal, that is capable of being received by the vehicle operator or other user. The signal corresponds to the cumulative mileage data.

4 Claims, 1 Drawing Sheet

U.S. PATENT DOCUMENTS

| | | | | |
|---|---|---|---|---|
| 5,900,803 | A * | 5/1999 | Politz et al. | 340/425.5 |
| 5,963,928 | A | 10/1999 | Lee | |
| 5,974,368 | A * | 10/1999 | Schepps et al. | 340/5.61 |
| 6,011,827 | A | 1/2000 | Kyrtsos | |
| 6,097,998 | A | 8/2000 | Lancki | |
| 6,114,952 | A | 9/2000 | Francesangeli et al. | |
| 6,122,588 | A * | 9/2000 | Shehan et al. | 701/93 |
| 6,343,844 | B1 * | 2/2002 | McCann et al. | 303/122.02 |
| 6,636,790 | B1 * | 10/2003 | Lightner et al. | 701/33 |
| 6,836,710 | B2 * | 12/2004 | Yamaki | 701/33 |
| 2003/0088348 | A1 * | 5/2003 | Gustavsson et al. | 701/35 |
| 2003/0220722 | A1 * | 11/2003 | Toba et al. | 701/1 |
| 2004/0249557 | A1 * | 12/2004 | Harrington et al. | 701/115 |

FOREIGN PATENT DOCUMENTS

JP 60208149 A * 10/1985

* cited by examiner

MILEAGE INFORMATION DISPLAY SYSTEM

CROSS REFERENCE TO RELATED APPLICATIONS

This application claims the benefit under 35 U.S.C. §119 (e) of U.S. Provisional Application 60/409,619 filed Sep. 10, 2002, titled OUTPUTTING ELECTRONIC ODOMETER INFORMATION USING ON-OFF FLASH CODES, which application is hereby incorporated by reference in its entirety.

BACKGROUND OF INVENTION

The invention relates in general to an electronic odometer for a trailer. More specifically, the invention provides a device and method for communicating odometer data to a vehicle user by controlling an output device with an ON-OFF code signal.

Cumulative mileage information for a trailer may be used to track the need for scheduled maintenance on the trailer. On a tractor, it is relatively common for the vehicle to have a numerical odometer which displays cumulative mileage to the user. On trailers, however, such numerical odometers are not often available.

An odometer function is presently incorporated into the electronic control units (ECU) of many antilock braking systems (ABS) intended for use on heavy duty tractors and trailers. The trailer-mounted ABS ECU can be used to provide odometer mileage information. To display the cumulative mileage from the trailer ABS ECU, however, the user must connect the trailer ABS ECU to an off diagnostic tool having a multi-character alpha-numeric display. With such conventional systems, the cumulative mileage for a trailer cannot be displayed without an off-board diagnostic tool.

SUMMARY OF INVENTION

The present invention utilizes an integral output device to communicate vehicle odometer mileage information the user without use of an off-board diagnostic tool. The odometer mileage information is encoded into an ON-OFF code signal that is supplied to the output device. The output device is activated and deactivated in response to the ON-OFF flash code. As a result, mileage information is communicated to the user via a series of encoded visible or audible pulses, thereby eliminating the necessity for a conventional off diagnostic tool with a multi-character alpha-numeric display.

In a preferred embodiment, an odometer communication system is provided that includes a user interface device that generates a request signal, a processing unit that calculates the cumulative mileage of the vehicle and encodes the cumulative mileage into an ON-OFF code in response to the request signal, and an output device that outputs the cumulative mileage in the form of a ON-OFF audible or visual output signal in response to the ON-OFF code.

In order to reduce the complexity of the ON-OFF output signal, the processing unit preferably truncates the cumulative mileage prior to generating the ON-OFF code. Accordingly, the number of numerals required to be recognized by the user is significantly reduced.

The output device can be any device that produces the desired output signal, including a visible output device or an audible output device. In a preferred embodiment, a trailer ABS warning light is used as a visible output device. In another preferred embodiment, an ABS modulator valve is used as an audible output device. In either case, the numeral zero is preferably represented by a strobe signal.

Other advantages and features of the invention will become apparent from the following detailed description of the preferred embodiments and the accompanying drawings.

BRIEF DESCRIPTION OF DRAWINGS

The invention will now be described with reference to certain preferred embodiments thereof and the accompanying drawings, wherein.

DETAILED DESCRIPTION

The odometer communication system for a vehicle of the present invention is described in relation to an exemplary trailer odometer display system 10 for a trailer vehicle in a tractor-trailer vehicle combination. The invention is not limited to a trailer vehicle of a tractor-trailer vehicle combination, but is described in relation thereto as a matter of convenience.

Figure 1:
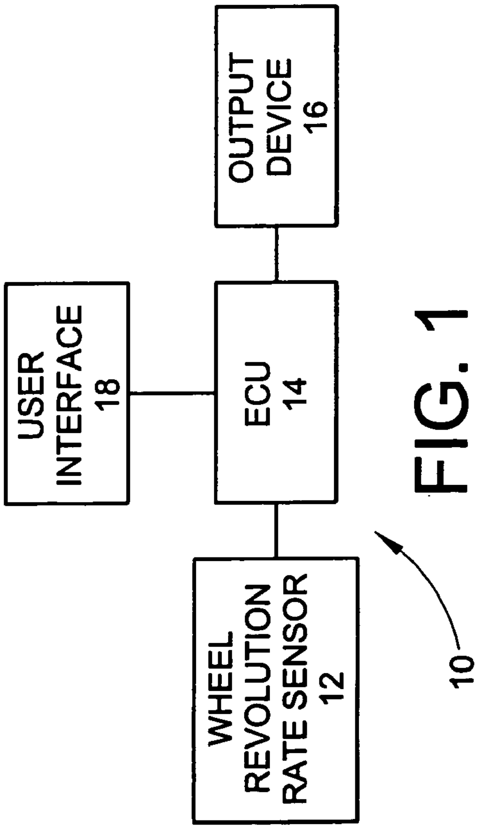
FIG. 1 is a block diagram of a trailer odometer display system in accordance with the present invention.

FIG. 1 is a block diagram of the trailer odometer display system 10 in accordance with the present invention. The trailer odometer display system 10 includes a wheel revolution rate sensor 12, an ECU 14, an output device 16, and a user interface 18.

The wheel revolution rate sensor 12 is preferably a wheel-mounted signal generating device which is a component of a conventional trailer ABS. However, any other suitable wheel revolution rate sensor 12 may be utilized, such as a drive shaft revolution sensor or a wheel axle revolution sensor. The wheel revolution rate sensor 12 is in circuit communication with ECU 14.

Preferably, the trailer ABS ECU is utilized as ECU 14, although an ECU separate from the trailer ABS ECU may readily be employed. The ECU 14 of the present invention that is in circuit communication with the wheel revolution rate sensor 12 and the output device 16 need not be a conventional multi-functional electronic control unit, but may include only that circuitry necessary to process the signal from the sensor 12 and to control the output device 16 in response thereto.

The output device 16 can be a visible output device or an audible output device. In a preferred embodiment, a conventional trailer ABS warning lamp functions as the output device 16. Alternatively, the output device 16 may be a lamp mounted at another location on the trailer or in the tractor cab. The output device 16 also may be an audible output device such as a horn, bell, or buzzer. In another embodiment, a conventional ABS modulator exhaust valve is utilized as an audible output device. In this latter case, the ECU 14 activates the ABS modulator exhaust valve to produce a pulsed noise referred to as "chuffing." Other output devices, such as displays, printers, etc., also may be used as desired for a particular application without departing from the spirit or scope of the invention.

The user interface 18 is preferably a brake pedal in the cab of the tractor which is connected to a brake light power switch, although other types of user interfaces may be readily employed. For example, a user-operated switch can be mounted on either the tractor cab or trailer. The user interface 18 provides the necessary signals to the ECU 14 to activate the output device 16. These signals and the activation of the output device 16 may be provided in any conventional manner.

The ON-OFF code is preferably a BLINK CODE utilized in a BLINK CODE diagnostic system, although other types of codes including Morse code can be utilized. The BLINK CODE communicates the operational status of the components of an ABS to the user. Conventional BLINK CODE diagnostics are capable of the following modes of operation: active-fault ABS diagnostics, fault history ABS diagnostics, clear active faults, and ABS system configuration check.

To operate the system in a preferred embodiment, the user requests BLINK CODE diagnostics by pumping the brake pedal in the tractor cab to cycle the brake light power ON for 1.0 second and OFF for 1.0 second for a predetermined number of cycles. For example, 3 cycles requests active-fault retrieval, 4 cycles requests fault history retrieval, 5 cycles requests clearing active faults, and 6 cycles requests ABS system configuration check. In response to the request, the ABS ECU communicates the requested diagnostics to the user by flashing the trailer ABS warning lamp. As required by Federal Motor Vehicle Standard S121, the ABS warning lamp must be mounted on the left side of the trailer as viewed from the rear, no closer than 150 mm (5.9 inches), and no further than 600 mm (23.6 inches) from the red rear side marker lamp. Alternatively, a switch or other activation mechanism may be used to activate the BLINK CODE diagnostics.

The BLINK CODE diagnostics system operates according to the following sequence. With ignition power on, the ECU 14 continuously monitors the number of brake light power cycles or other BLINK CODE switch cycles, to determine whether or not to activate a BLINK CODE diagnostics mode. A BLINK CODE diagnostics mode may only be activated immediately following vehicle ignition power-up, when the vehicle is parked. If wheel speeds which are indicative of vehicle movement are detected during BLINK CODE diagnostics mode, the ECU 14 immediately exits BLINK CODE diagnostics and returns to normal operating mode. To prevent unintentional activation of BLINK CODE diagnostics mode, the brake light power cycle counter is disabled when ignition power is continuously ON for more than 15.0 seconds without entering BLINK CODE mode. The maximum constant brake light power ON duration before disabling the brake light power cycle counter is 5.0 seconds.

The user requests activation of a desired BLINK CODE diagnostics mode by cycling the brake light power ON and OFF. In response to the request, the ECU 14 initiates the appropriate BLINK CODE diagnostics mode. After activation of the requested BLINK CODE diagnostics mode, there is a 5.0 second delay before output of the diagnostics commences. Once the ABS warning lamp begins displaying codes, the ECU 14 does not respond to any additional brake light power cycling, until all BLINK CODE messages have been displayed and the unit has returned to normal operating mode.

The present invention adds to BLINK CODE diagnostics the capability to display or communicate odometer mileage to the vehicle operator.

Figure 2:
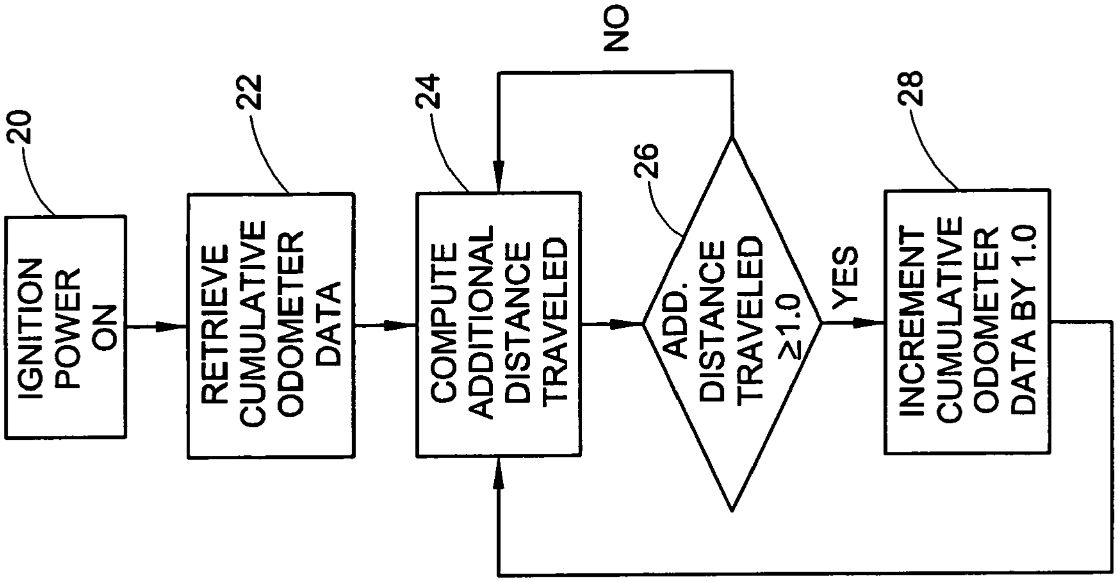
FIG. 2 is a flow chart showing the operation of an ECU calculating trailer odometer information in accordance with the present invention.

FIG. 2 is a flow chart depicting how the ECU 14 stores and displays trailer odometer information in accordance with the present invention. Immediately after ignition power on, step 20, the ECU 14 retrieves the previously stored cumulative mileage data from its memory in step 22. As the trailer moves, the ECU 14 computes the additional distance traveled in step 24 based on signals received from the wheel revolution rate sensor 12. Additional mileage is computed by utilizing a revolutions per minute signal from the wheel revolution rate sensor 12 to compute trailer velocity and derive distance traveled.

To increase the accuracy of the mileage data, a wheel rolling radius and a wheel-mounted tone ring tooth count may be pre-stored in the ECU 14 and taken into account when performing the mileage calculations. Any conventional mileage detection technique may be used without departing from the spirit and scope of the invention. Once the additional distance traveled exceeds a predetermined unit, for example one mile as indicated in step 26, the ECU 14 increments the cumulative odometer data by one, represented in step 28. The predetermined unit may be any value. One mile is a preferred value for this unit.

In case of a loss of power, the ECU 14 does not store the accumulated additional distance traveled since the last update of the cumulative odometer data. For example, if the predetermined unit is one mile, and the vehicle has accumulated 18.4 miles since power-up, upon loss of power the stored mileage remains at the value of the last update, namely, 18.0 miles. The result is a one unit maximum accuracy per power-up. Accordingly, for mileage to be accurately accumulated over the lifetime of the trailer, it is preferable that the ECU 14 be provided with a power back-up system to maintain constant power.

The ECU 14 is preferably capable of storing vehicle mileage up to a desired value, for example, 9,999,999 miles. When the odometer mileage counter function is full, it will latch and not record or calculate any additional mileage. A reset function, however, may be provided.

In a preferred embodiment, the user utilizes BLINK CODE diagnostics discussed above to request the display of odometer mileage. With ignition power on, the ECU 14 continuously monitors the number of brake light power ON-OFF cycles (or other activation switch cycles), to determine whether or not to activate the odometer mileage display mode. To activate the odometer mileage display mode, the user repeatedly depresses the brake pedal (or otherwise activates a switch), which acts as the user interface 18, to repeatedly cycle the brake light power switch ON and OFF a predetermined number of times.

Each ON-OFF cycle has a pre-determined frequency. In a preferred embodiment, the frequency is ON for 1.0 second, and then OFF for 1.0 second. Following activation of the odometer mileage display mode, the ECU 14 initiates a delay which turns the output device 16, preferably the trailer ABS warning lamp, OFF followed by a BLINK CODE display of the cumulative mileage. A different lamp, however, may be provided for the function.

In a preferred embodiment, the cumulative mileage is being communicated with a device that is cycled ON and OFF. It is preferable, therefore, to find a way to reduce the complexity of the signal that will be communicated to the user. A preferred method is to have the ECU 14 truncate the cumulative mileage to the nearest thousand prior to encoding. For example, if the electronically recorded mileage is 120,555 units, the ECU 14 truncates the mileage so that a display of only the numeral 120 will be required, with it being understood that the displayed result is multiplied by one thousand. Truncation minimizes the number of displayed numerals to reduce the possibility that the vehicle operator or other user will lose count of the mileage information. If an exact count is desired, however, the ECU 14 can be programmed to encode the entire cumulated mileage for output. Accordingly, it is desirable to store the complete cumulated mileage and only truncate the display if desired.

In a preferred embodiment of the invention, BLINK CODE is utilized to encode the truncated cumulative mileage. The ten numerals (0–9) are encoded as follows:

Numeral BLINK CODED numeral
0 strobe (ON-OFF-ON-OFF)
1 one (ON-OFF) blink
2 two(ON-OFF) blinks
3 three (ON-OFF) blinks
4 four (ON-OFF) blinks
5 five(ON-OFF) blinks
6 six (ON-OFF) blinks
7 seven (ON-OFF) blinks
8 eight (ON-OFF) blinks
9 nine(ON-OFF) blinks To display the numeral zero, the output device 16 is quickly strobed (ON-OFF-ON-OFF) at a pre-determined frequency for a pre-set duration, preferably 0.2 Hz for a duration of 0.4 seconds. To display the numerals one through nine, the duration of the ON is 0.4 seconds, and the duration of the OFF blink is 0.4 seconds. There is an OFF pause between each BLINK CODED numeral, and the duration of the OFF pause is preferably 1.0 second. There is an OFF message break between each BLINK CODED OFF message, and the duration of the message break is preferably 2.5 seconds. An ON completion pulse is generated to indicate the end of a message. During the ON completion pulse, the output device 16 is turned ON for preferably 5.0 seconds, and then BLINK CODE mode is automatically exited and the output device 16 is returned to its normal operating mode.

All of these values are intended to be exemplary and should not be construed in a limiting sense. Any suitable cycle time/pulse time may be used.

For example, if the electronically recorded mileage is 120,555 units, the mileage is truncated to 120. The ECU 14 will then encode these numerals and display the following sequence:

one (ON-OFF) blink-OFF pause;
two (ON-OFF) blinks-OFF pause;
strobe (ON-OFF-ON-OFF)-OFF pause; and 5.0 second ON completion pulse.

The output device 16 may also be an antilock brake system (ABS) modulator valve, which will provide an audible indication. In such a case, the ECU 14 activates an exhaust valve of an air brake pressure modulator to create a quick audible pulse of air known as "chuffing." The audible pulse is made louder when the user places his foot on the brake pedal to increase air pressure. The durations specified above for the BLINK CODE as it relates to the visible display of the odometer mileage may also be used for the durations of the audible air blasts from the ABS modulator valve corresponding to the odometer mileage.

The invention has been described with reference to certain preferred embodiments thereof. It will be understood, however, that modification and variations are possible within the scope of the appended claims. For example, although a preferred embodiment of the invention utilizes the ABS warning lamp as the output device 16, any type of output device that conveys an audible or visible signal to the user may be employed. Further, the output device may be incorporated in the tractor cab or the trailer. Moreover, frequencies and durations may be modified from those specified herein without departing from the spirit or scope of the invention.

The invention claimed is:

1. A mileage communication system for a vehicle comprising:

a user interface device capable of generating a request signal;

a processing unit capable of calculating cumulative mileage of the vehicle and encoding the cumulative mileage into a code in response to the request signal; and an audible output device in circuit communication with the processing unit and capable of communicating the cumulative mileage in the form of a signal in response to the code, wherein the audible output device comprises an ABS modulator valve.

2. A method for communicating vehicle mileage information to a vehicle operator comprising:

calculating cumulative mileage of the vehicle;

generating a request signal with a user interface device;

encoding the cumulative mileage into a code by an electronic control unit; and outputting the cumulative mileage in the form of a signal by an audible output device in response to the code generated by the electronic control unit, wherein the audible output device comprises an ABS modulator valve.

3. A mileage communication system for a vehicle comprising;

user interface means for generating a request signal;

processing means for calculating the cumulative mileage of the vehicle and encoding the cumulative mileage into a code in response to the request signal; and output means, responsive to the code generated by the processing means, for outputting the cumulative mileage in the form of a signal, wherein the output means comprises an ABS modulator valve.

4. A mileage communication system for a vehicle comprising;

user interface means for generating a request signal;

processing means for calculating the cumulative mileage of the vehicle and encoding the cumulative mileage into a code in response to the request signal; and output means, responsive to the code generated by the processing means, for outputting the cumulative mileage in the form of a signal, wherein the user interface means comprises a vehicle brake pedal.

* * * * *